United States Patent
Ide et al.

(10) Patent No.: US 7,800,488 B2
(45) Date of Patent: Sep. 21, 2010

(54) WHEEL CONDITION MONITORING SYSTEM AND WHEEL POSITION DETECTION METHOD

(75) Inventors: Nobuhiro Ide, Toyota (JP); Shinya Sugiura, Nagoya (JP); Hideo Iizuka, Nissin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 626 days.

(21) Appl. No.: 11/755,332

(22) Filed: May 30, 2007

(65) Prior Publication Data
US 2007/0279205 A1 Dec. 6, 2007

(30) Foreign Application Priority Data
May 31, 2006 (JP) .............................. 2006-152105

(51) Int. Cl.
B60C 23/00 (2006.01)
(52) U.S. Cl. ........................ 340/447; 340/442; 340/10.1
(58) Field of Classification Search ......... 340/442–448, 340/10.1; 343/443, 444, 445, 446, 447, 448, 343/449, 833; 116/34 A, 34 B, 34 R; 73/146, 73/146.2–146.6; 152/152.1, 415
See application file for complete search history.

(56) References Cited

U.S. PATENT DOCUMENTS

| | | | | |
|---|---|---|---|---|
| 6,967,570 B2 * | 11/2005 | Tsuji et al. | .................. | 340/442 |
| 7,262,688 B2 * | 8/2007 | Ogawa et al. | ................ | 340/438 |
| 2003/0098787 A1 * | 5/2003 | Lin | ............................ | 340/442 |
| 2005/0035772 A1 * | 2/2005 | Bauer et al. | ................. | 324/712 |
| 2005/0172707 A1 * | 8/2005 | Kanatani et al. | .............. | 73/146 |
| 2007/0146829 A9 * | 6/2007 | Coons et al. | ................ | 358/504 |
| 2007/0159315 A1 * | 7/2007 | Murata et al. | ............... | 340/447 |

FOREIGN PATENT DOCUMENTS

| | | |
|---|---|---|
| JP | 2003-175711 | 6/2003 |
| JP | 2003-196777 A | 7/2003 |
| JP | 2003-306017 A | 10/2003 |
| JP | 2004-139152 | 5/2004 |
| JP | 2004-161245 | 6/2004 |
| JP | 2004-196007 A | 7/2004 |
| JP | 2004-359122 A | 12/2004 |
| JP | 2005-47470 | 2/2005 |
| JP | 2005-263021 A | 9/2005 |
| WO | WO 2006/038557 A1 | 4/2006 |
| WO | WO 2006038557 A1 * | 4/2006 |

* cited by examiner

Primary Examiner—Benjamin C Lee
Assistant Examiner—Quang Pham
(74) Attorney, Agent, or Firm—Oblon, Spivak, McClelland, Maier & Neustadt, L.L.P.

(57) ABSTRACT

A wheel condition monitoring system includes a plurality of transmitters; a receiver; an antenna directivity control unit; a memory unit; and a wheel position determination unit. The transmitters are at each wheel of the vehicle, and transmit signals that include wheel condition data and identification data of themselves. The receiver receives the transmission signals so that the wheel condition monitoring system monitors the conditions of the respective wheels based thereon. The antenna directivity control unit controls the antenna directivity of the receiver. The memory unit stores the identification data by assigning relations between the identification data and the position of the corresponding wheel. The wheel position determination unit determines the position of the wheel at which the transmitter is installed based on the relations.

18 Claims, 7 Drawing Sheets

| No. | x[Ω] FL | x[Ω] FR | x[Ω] RL | x[Ω] RR | $Z_{in}$ | VSWR($Z_0$=50 Ω) |
|---|---|---|---|---|---|---|
| α | −80 | 80 | −80 | 80 | 47.38−30.52j | 1.86 |
| β | −100 | 100 | −100 | 100 | 67.94−26.17j | 1.71 |
| γ | −100 | −100 | −100 | 0 | 42.42+30.44j | 1.95 |
| δ | −50 | −50 | −50 | 0 | 49.70−8.81j | 1.19 |

FIG. 10

WHEEL CONDITION MONITORING SYSTEM AND WHEEL POSITION DETECTION METHOD

INCORPORATION BY REFERENCE

The disclosure of Japanese Patent Application No. 2006-152105 filed on May 31, 2006 including the specification, drawings and abstract is incorporated herein by reference in its entirety.

BACKGROUND OF THE INVENTION

1. Field of the Invention

The present invention relates to a wheel condition monitoring system and a wheel position detection method. In particular, the invention relates to a wheel condition monitoring system that includes transmitters installed at each wheel of a vehicle that transmit wheel condition data indicating the condition of each wheel and a receiver installed on the body of the vehicle that receives the wheel condition data from the transmitters to thereby monitor the condition of each wheel, and a wheel position detection method used therein.

2. Description of the Related Art

A conventional wheel condition monitoring system monitors conditions such as tire air pressure for each wheel (for example, see Japanese Patent Application Publication No. JP-A-2004-161245). The system includes sensor units installed at each wheel that monitor the conditions of the corresponding wheel and transmit signals that include the detected results and a monitoring unit installed on the body of the vehicle that receives the signals from the sensor units to monitor the conditions of the wheels. Further, the system includes a plurality of main body transmitters installed at the main body of the vehicle in a manner corresponding to the respective positions of the wheels, each of which transmits an instruction signal for requesting the transmission signal to be transmitted by the corresponding sensor unit; and wheel receivers installed at the respective sensor units that receive the instruction signals from the respective main body transmitters.

In the above-mentioned system, at first, the instruction signals are intermittently transmitted from the main body transmitters in a sequential manner. When an instruction signal is transmitted from one of the main body transmitters, the instruction signal is received by only one of the wheel receivers installed at one of the wheels corresponding to the main body transmitter that has transmitted the instruction signal. When the wheel receiver receives the instruction signal, the sensor unit corresponding to the wheel receiver measures the conditions of the corresponding vehicle and transmits the measured results. Subsequently, the monitoring unit in the main body of the vehicle receives the transmission signal from the sensor unit and monitors the conditions of the vehicle.

In accordance with the described system, the conditions at each wheel can be monitored by requesting the sensor units to transmit the appropriate signals. Thus, even though identification (ID) codes of the respective sensor units are not recorded in association with the positions of the wheels, it is possible to detect which ones of the sensor units have transmitted the respective transmission signals (in other words, it is possible to determine the positions of the wheels at which the respective sensor units are installed), so that the conditions of the wheels can be monitored more precisely with respect to the respective positions thereof.

However, in accordance with the above-mentioned system, although a reception antenna in the monitoring unit at the main body of the vehicle need not be installed at each position of the wheels and it is sufficient to install the reception antenna at only a single place near a central portion of the vehicle, it is still necessary to install a plurality of main body transmitters corresponding to the respective positions of the wheels. Therefore, the configuration of the monitoring unit at the main body of the vehicle becomes complicated, and the production cost thereof is increased.

SUMMARY OF THE INVENTION

The present invention provides a wheel condition monitoring system and a wheel position detection method capable of determining the respective positions of the wheels at which the wheel-mounted transmitters that have transmitted the respective wheel condition data are installed by using a simple configuration.

In accordance with one aspect of the present invention, there is provided a wheel condition monitoring system that includes a plurality of transmitters installed at each wheel of a vehicle, which transmit wheel condition data that indicates the condition of the corresponding wheel, and a receiver installed on the main body of the vehicle, which receives the wheel condition data from the transmitters. The wheel condition monitoring system monitors the condition of each wheel based on the wheel condition data received by the receiver, which further includes an antenna directivity control unit that controls the antenna directivity of the receiver; a memory unit that assigns relations between the identification data, received by the receiver, of each transmitter and the position of the corresponding wheel, and stores the assigned relations when the antenna directivity of the receiver is changed by the antenna directivity control unit so that an antenna gain is maximized based on the position and orientation of each wheel; and a wheel position determination unit that determines the wheel position of the transmitter that transmitted a transmission signal including the wheel condition data and identification data received by the receiver, based on the relation between the identification data of each transmitter and the position of the corresponding wheel stored in the memory unit.

Another aspect of the present invention provides a method for determining the position of the corresponding wheel at which a transmitter is installed in a wheel condition monitoring system that includes a plurality of transmitters installed at each wheel of a vehicle, which transmit wheel condition data that indicates the condition of the corresponding wheel, and a receiver installed on the main body of the vehicle, which receives the wheel condition data from each transmitter so that the wheel condition monitoring system monitors the conditions of the respective wheels based on the wheel condition data received by the receiver. The wheel position detection method determines the wheel position of the transmitter that has transmitted the wheel condition data. To determine the wheel position of the transmitter, an antenna directivity control is executed to control the antenna directivity of the receiver; then the identification data of the transmitter received by the receiver is stored in a memory unit, and the relation between the identification data and the respective wheel positions is assigned, when the antenna directivity of the receiver is changed by the antenna directivity control to maximize the antenna gain in the direction toward each wheel; and in addition the wheel position of the transmitter that has transmitted a transmission signal including the wheel condition data is determined based on the relations between the identification data and the positions of the respective wheels stored in a memory unit, when the receiver receives the wheel condition data and the identification data from one of the transmitters.

In accordance with these aspects of the present invention, the antenna directivity of the receiver installed on the main body of the vehicle may be changed. If the antenna directivity is changed so that the antenna gain of the receiver is maximized in a direction toward a specific wheel, the receiver on the main body receives a transmission signal from only the specific transmitter installed at that wheel. Therefore, if the antenna directivity changes so that the antenna gain of the receiver is maximized in a direction toward each wheel, the position of the specific wheel toward which the antenna is directed can be precisely determined in association with the specific transmitter that transmitted the transmission signal received by the receiver whenever the antenna directivity is changed as described above.

In accordance with the present invention, the identification data of each transmitter received by the receiver is stored in the memory unit in association with the position of each wheel. Thereafter, when the transmission signal from one of the transmitters is received by the receiver, the position of the wheel at which the transmitter is installed is determined based on the relations between the identification data and the position of the corresponding wheel stored in the memory unit. In this configuration, to determine the position of the wheel at which a specific transmitter is installed, it is not necessary to install a plurality of main body transmitters corresponding to the position of each wheel, and, further, it is sufficient to install the main body receiver at only a single place near a central portion of the vehicle so that it is not necessary to install the main body receiver at each wheel.

Meanwhile, in an antenna that includes a feed antenna element having a feeder and parasitic antenna elements that control a reactance component thereof, the directivity of the antenna may be changed by varying the reactance component of the parasitic antenna elements. Therefore, in the wheel condition monitoring system described above, the receiver may include a feed antenna element. In addition, a plurality of parasitic antenna elements may be arranged apart from the feed antenna element in directions toward the respective wheels, respectively.

Further, to determine the relation between the identification data of each transmitter and the position of the corresponding wheel, it is not necessary to change the antenna directivity so that the antenna gain is maximized in all the directions towards the wheels, but it is sufficient to change the antenna directivity in such a manner that the antenna gain is maximized in a specific number of directions, wherein the specific number of directions are directions toward a number of the wheels, and the specific number is a number that is one less than the total number of the wheels. Therefore, in the wheel condition monitoring system, the antenna directivity of the receiver may be changed in at least all-but-one directions among directions toward the wheel positions, that is, may be changed n times by the antenna directivity control unit such that the antenna gain is maximized in each of n number of directions, said n number of directions being directions toward n number of the wheels, and n being the total number of the wheels or the number one less than the total number of the wheels.

Furthermore, in the wheel condition monitoring system, if the ignition switch is turned on or a predetermined switch is manipulated by an occupant of the vehicle, the antenna directivity of the receiver may be changed by the antenna directivity control unit such that the antenna gain is sequentially maximized in the directions toward the respective wheels.

Further, if a time interval from the time when the ignition switch is turned off to the next subsequent time that the ignition switch is turned on or a time interval from the time of a manipulation of the predetermined switch to the time of a next manipulation of the predetermined switch is relatively short, it rarely happens that the wheels are exchanged to change the positions thereof. Therefore, in the wheel condition monitoring system, the antenna directivity of the receiver may remain unchanged if a time interval from the time when the ignition switch is turned off to the next time that the ignition switch is turned on or a time interval from the time of a manipulation of the predetermined switch to the time of a next manipulation of the predetermined switch is shorter than a predetermined time.

In addition, when the antenna directivity of the receiver is changed again so that the relations between the identification data of the transmitters and the positions of the wheels need to be redefined after the relations between the identification data of the transmitters and the positions of the wheels were once stored in the memory unit, if the relations between the identification data of the transmitters and the first one or two positions of the wheels toward which the antenna is directed since the antenna directivity was started to be changed are same as the previous relations stored in the memory unit, it can be deduced that the wheels are not exchanged and therefore the positions of the wheels are same as the preceding ones. Therefore, in the wheel condition monitoring system, it is preferable that the antenna directivity remains unchanged if, when the antenna directivity of the receiver has been changed for the first one or two times, the relations between the identification data received by the receiver from the transmitters and the positions of the wheels match the relations between the corresponding identification data and the corresponding positions of the wheels already stored in the memory unit.

Further, in the wheel condition monitoring system, after the identification data of each transmitter is stored in the memory unit by assigning the relations between the identification data of each transmitter and the position of the corresponding wheel, the antenna directivity of the receiver is changed so that the antenna gain of the receiver is constant in all directions. With this configuration, once the relation between the identification data of each transmitter and the corresponding wheel is stored in the memory unit, the respective positions of the wheels at which transmitters are installed can be precisely detected even when the transmission signals are transmitted randomly from the transmitters of the respective wheels.

Furthermore, the wheel condition monitoring system may further include a body-mounted transmitter that is installed on the main body of the vehicle and that transmits toward each wheel an instruction signal to have each transmitter transmit the wheel condition data. In addition, a wheel-mounted receiver may also be installed at each wheel that receives the instruction signal from the body-mounted transmitter, wherein, when the wheel-mounted receiver receives the instruction signal from the body-mounted transmitter, each wheel-mounted transmitter transmits a signal that indicates the condition of the corresponding wheel in response to the instruction signal. With this configuration, the relations between the identification data of the respective transmitters and the positions of the wheels stored in the memory unit pursuant to the change in the antenna directivity of the receiver can be efficiently determined.

In accordance with the present invention, the position of the wheel at which the transmitter that transmitted the wheel condition data is installed can be determined by using a simple configuration.

BRIEF DESCRIPTION OF THE DRAWINGS

The above and other objects and features of the present invention will become apparent from the following description of exemplary embodiments given in conjunction with the accompanying drawings, in which:

FIGS. 4A and 4B provide component layouts of a reception antenna included in the monitoring unit in accordance with the first embodiment, wherein

DETAILED DESCRIPTION OF THE EXEMPLARY EMBODIMENTS

Hereinafter, an embodiment of the present invention will be described with reference to the accompanying drawings.

A wheel monitoring system in accordance with the first embodiment of the present invention is installed in a vehicle having four wheels 18 and monitors conditions such as a tire air pressure or a temperature of wheel 18.

Figure 1:
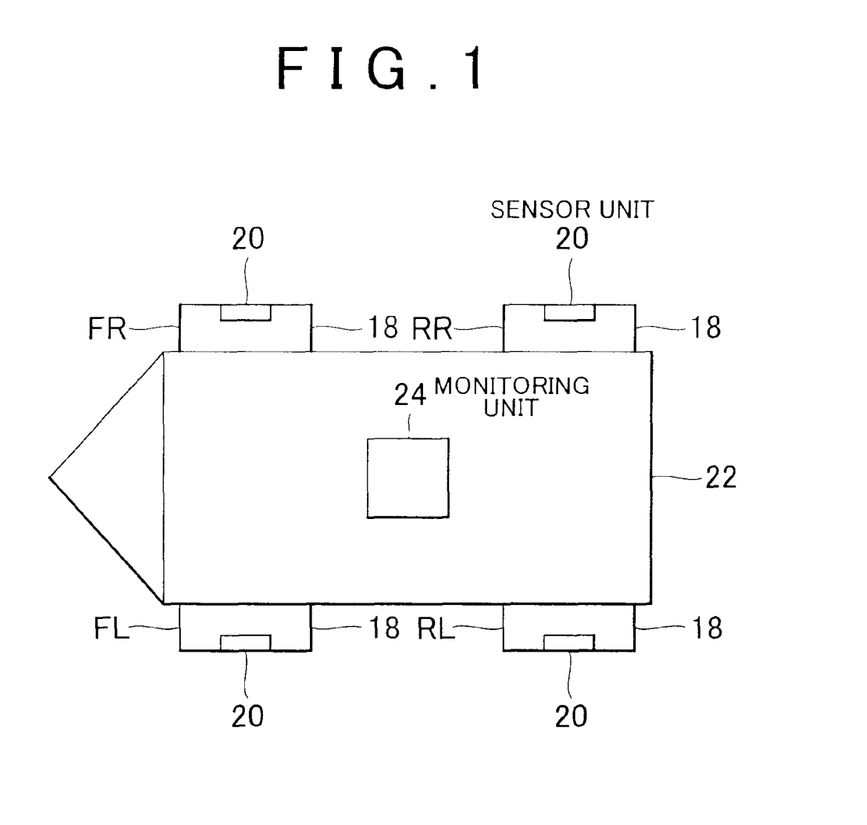
FIG. 1 shows a configuration diagram of a wheel condition monitoring system in accordance with a first embodiment of the present invention.

As shown in FIG. 1, the wheel monitoring system in accordance with the present embodiment includes sensor units 20 installed at each wheel 18 (hereinafter, sensor units 20 will also referred to as 20-1 to 20-4, respectively); and a monitoring unit 24 installed on the main body 22 of the vehicle. The sensor units 20 are fixed inside of respective tires (for example, at respective rims) so that the sensor units 20 rotate together with the corresponding wheels. Further, the monitoring unit 24 may be installed near a central portion of the main body 22 of the vehicle.

Figure 2:
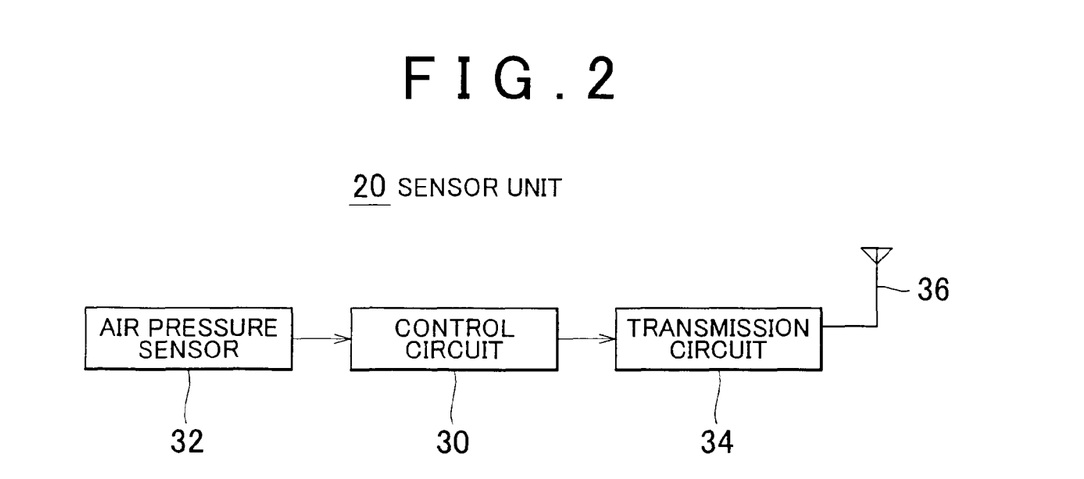
FIG. 2 illustrates a configuration diagram of each sensor unit in accordance with the first embodiment.

As shown in FIG. 2, each sensor unit 20 includes a control circuit 30 that performs various controls; an air pressure sensor 32; a transmission circuit 34; and a transmission antenna 36. The control circuit 30 is connected to the air pressure sensor 32 for outputting a pressure output signal corresponding to the tire air pressure of the corresponding wheel 18. The pressure output signal output by the air pressure sensor 32 is input to the control circuit 30. Then, the control circuit 30 measures the tire air pressure of the corresponding wheel 18 based on the pressure output signal output by the air pressure sensor 32. Further, the control circuit 30 generates a transmission signal that includes the air pressure data indicating the measured air pressure and identification data representing identification codes ID1 to ID4, which identifies each sensor unit 20.

Further, the control circuit 30 is also connected to the transmission circuit 34, which is in turn connected to the transmission antenna 36. The control circuit 30 controls the transmission circuit 34 to have the generated transmission signal be transmitted through the transmission antenna 36. The transmission circuit 34 has the transmission signal that has been generated by the control circuit 30 be carried by a predetermined electromagnetic wave, e.g., an RF (radio frequency) wave of hundreds of MHz, functioning as a carrier wave and then transmitted from the transmission antenna 36.

Figure 3:
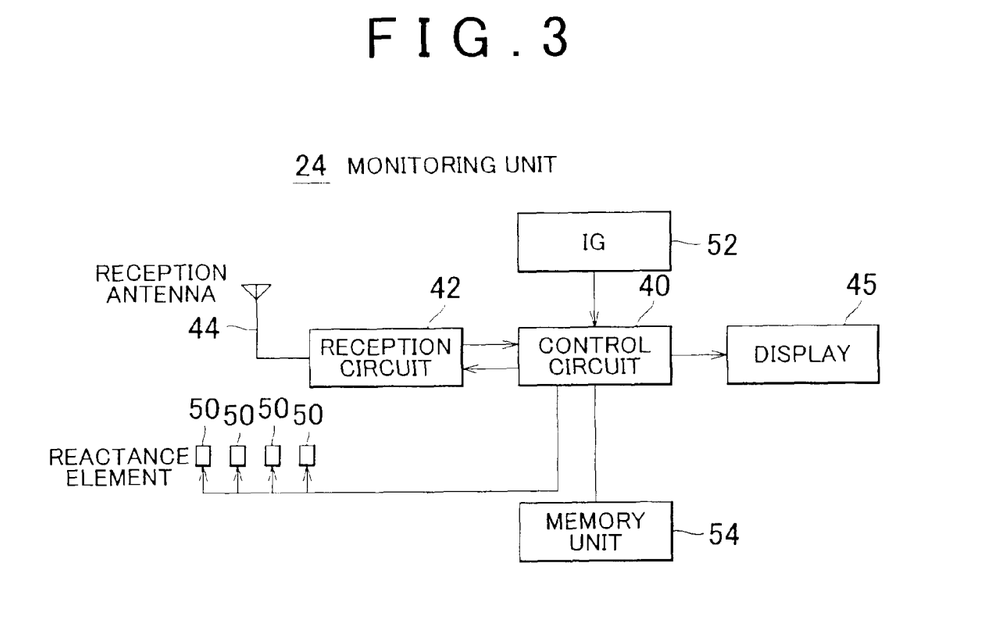
FIG. 3 shows a configuration diagram of a monitoring unit in accordance with the first embodiment.

As shown in FIG. 3, the monitoring unit 24 includes a control circuit 40 configured mainly by a computer for performing various controls; a reception circuit 42; a reception antenna 44; a display 45; and a memory unit 54. The control circuit 40 is connected to the reception circuit 42, which is in turn connected to the reception antenna 44. The reception antenna 44 receives the transmission signal transmitted from the sensor unit 20 and carried by the carrier wave. Then, the reception circuit 42 detects the signal received by the reception antenna 44, shapes a waveform thereof, and then provides the wave-shaped signal to the control circuit 40. Thereafter, the control circuit 40 extracts from the transmission signal the air pressure data of the wheel 18 and the identification code of the sensor unit 20 that has transmitted the transmitted signal, based on the signal provided by the transmission circuit 42.

When extracting data from the transmission signal transmitted from one of the sensor units 20, the control circuit 40 determines the state of the tire air pressure (for example, a normal state or an abnormal state due, for example, to a pressure drop) of the wheel 18 at which that one of the sensor units 20 is installed based on the extracted data. The control circuit 40 is also connected to a display 45 that is easily viewed by the occupant, installed at an installment panel or a meter in the vehicle. The control circuit 40 makes the determined state of the tire air pressure of the wheel 18 be displayed on the display 45. For example, the display 45 shows the position of the wheel 18 whose tire is in an abnormal state of the air pressure by lighting a corresponding part in a vehicle-like display image. Alternatively, the vehicle may be provided with a speaker or an alarm buzzer that operates when the abnormal state of the tire air pressure of the wheel 18 occurs to notify the occupant of the abnormal state together with the position of the wheel 18 whose tire is in the abnormal state.

Figure 4A:
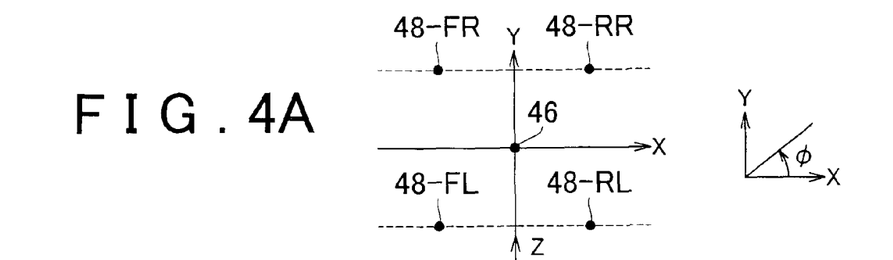
FIG. 4A is a plane view thereof and FIG. 4B is a side view thereof.
Figure 4B:
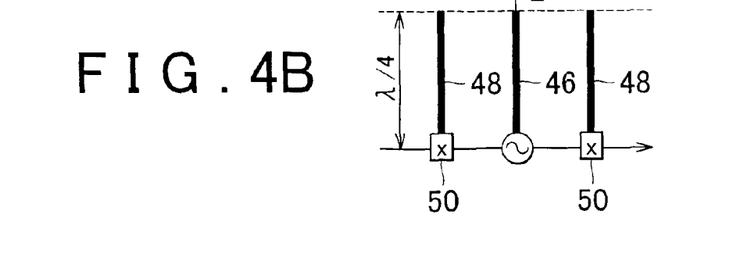

Further, as shown in FIGS. 4A and 4B, the reception antenna 44, which is an adaptive antenna that controls its directivity, includes a feed antenna element 46; and four parasitic antenna elements 48. The antenna elements 46 and 48 are arranged substantially on a same horizontal plane (which will be defined as XY-plane) in the main body 22 of the vehicle, and have a height (i.e., Z-direction) that is about one fourth of a wavelength of the transmission signals transmitted from the sensor units 20. As shown in FIGS. 4A and 4B, the reception antenna 44 is configured such that the four parasitic antenna elements 48 are arranged to be separated from each other at a same distance and to surround the feed antenna element 46. Further, the parasitic antenna elements 48 are respectively arranged at positions distanced from the feed antenna element 46 in directions toward the respective wheels 18 of the vehicle (these directions will be referred to as FL, FR, RL and RR, respectively).

The parasitic antenna elements 48 have variable reactance elements 50 (whose reactance values are $x_{FL}$, $x_{FR}$, $x_{RL}$ and $x_{RR}$, respectively) as respective loads. The reactance elements 50 are connected to the control circuit 40, and respective reactance values x can be varied under the control of the control circuit 40. In the reception antenna 44, the antenna directivity can be controlled by controlling the reactance value x of each of the parasitic antenna elements 48 to have the parasitic antenna elements 48 operate as a director or a reflector.

Figure 5A:
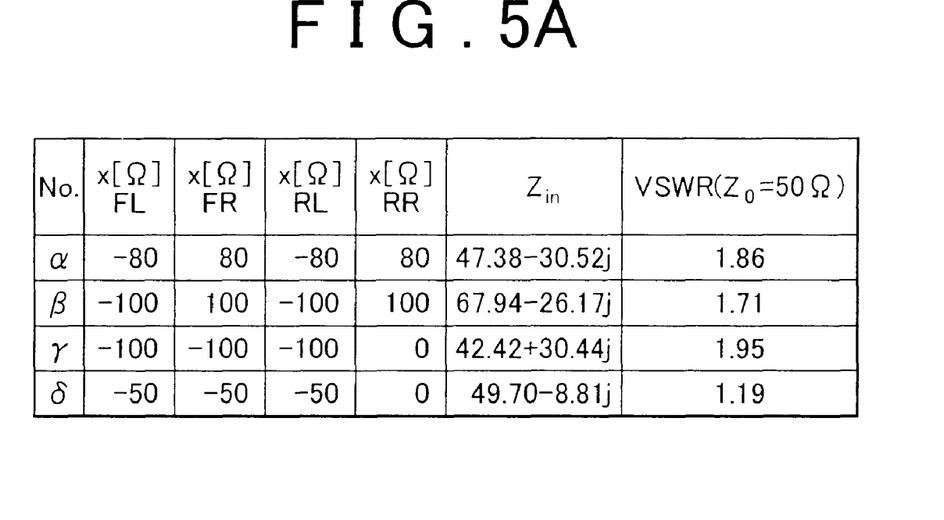
FIGS. 5A and 5B set forth a table and a graph, respectively, for describing some variations of the antenna directivity as obtained by controlling a reactance of parasitic antenna elements in accordance with the first embodiment.
Figure 5B:
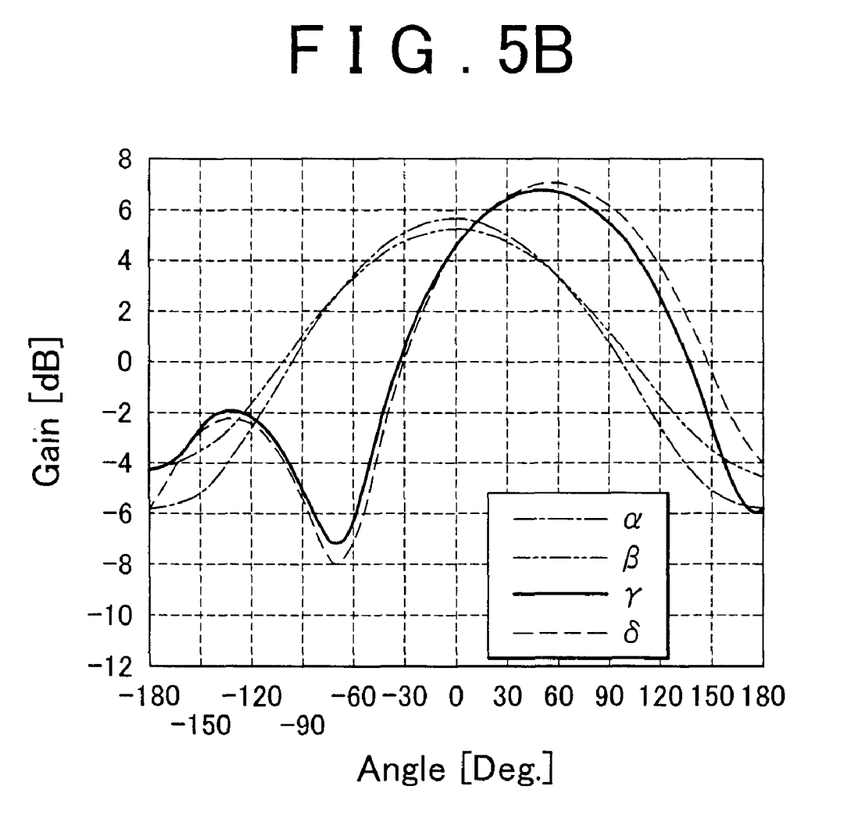

FIGS. 5A and 5B set forth a table and a graph, respectively, for describing some variations of the antenna directivity achieved by controlling the reactance of the parasitic antenna elements in accordance with the present embodiment. Herein, FIG. 5A shows a table for describing four exemplary patterns of the combination of the reactive values x (i.e., $x_{FL}$, $x_{FR}$, $x_{RL}$ and $x_{RR}$) of the parasitic antenna elements 48, and FIG. 5B shows the operational gain to describe the respective operating gains on the XY-plane in case of the patterns shown in FIG. 5A.

As shown in FIGS. 5A and 5B, if, for example, the combination of the reactance values x of the parasitic antenna elements 48 is an α-pattern or a β-pattern, the antenna directivity is determined such that the maximum gain is obtained in a direction toward the back of the vehicle on the XY-plane that is horizontal to the main body 22 of the vehicle. Further, if the combination is a γ-pattern or a δ-pattern, the antenna directivity is determined such that the maximum gain is obtained in a direction at an angle φ that is approximately equal to 60° from the direction toward the back of the vehicle on the XY-plane.

The control circuit 40 stores therein certain combinations of the four reactance values $x_{FL}$, $x_{FR}$, $x_{RL}$ and $x_{RR}$ of the parasitic antenna elements $48_{FL}$, $48_{FR}$, $48_{RL}$ and $48_{RR}$ that are estimated to allow the antenna directivity of the reception antenna 44 to be maximized in directions FL, FR, RL and RR (i.e., directions from the feed antenna element 46 in the reception antenna 44 to the respective wheels 18), respectively, so that the reception antenna 44 receives the transmission signals from only the corresponding sensor units 20 installed at the corresponding wheels 18 in the directions FL, FR, RL and RR, respectively. Further, the control circuit 40 also stores therein another combination of the four reactance values $x_{FL}$, $x_{FR}$, $x_{RL}$ and $x_{RR}$ that is estimated to allow the reception antenna 44 to receive the transmission signals from all of the sensor units 20 regardless of the wheels 18. The above-described combinations are obtained by experiments performed in advance. When controlling the antenna directivity, the control circuit 40 reads out an appropriate combination of the four reactance values $x_{FL}$, $x_{FR}$, $x_{RL}$ and $x_{RR}$ stored therein, and then adjusts the reactance values of the reactance elements 50 of the parasitic antenna elements $48_{FL}$, $48_{FR}$, $48_{RL}$ and $48_{RR}$ to the appropriate combination of the reactance values.

The control circuit 40 is also connected to an ignition switch 52 that turns on and off operations of electric devices installed in the vehicle. The ignition switch 52 is configured such that its status can be switched between ON and OFF by a manipulation of an occupant of the vehicle. The control circuit 40 determines whether the status of the ignition switch 52 has been switched from OFF to ON.

Further, the control circuit 40 is also connected to the memory unit 54 that is readable and writable. The memory unit 54 stores the positions FL, FR, RL and RR of each wheel 18 of the vehicle and the ID code of each sensor unit 20 located at the corresponding position FL, FR, RL and RR. The control unit 40 writes the identification codes ID of the respective sensor units 20 into the memory unit 54 by associating the identification codes ID with the positions FL, FR, RL and RR of the respective wheels 18 at a certain timing that will be described later, and reads out the identification codes ID of the respective sensor units 20 from the memory unit 54.

Figure 6A:
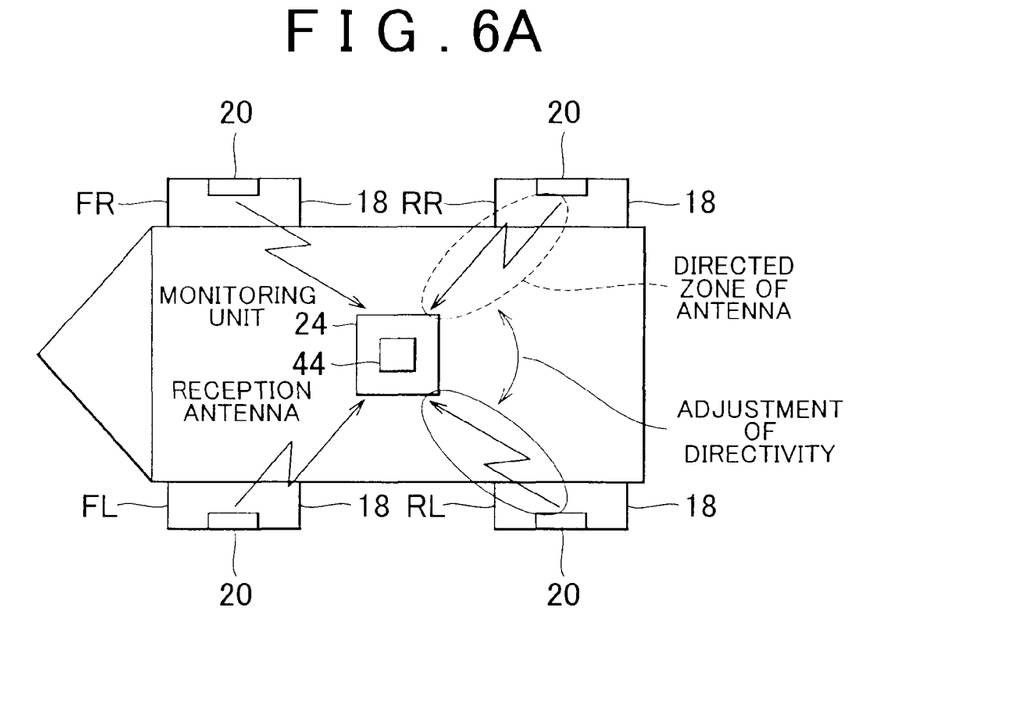
FIGS. 6A and 6B present conceptual diagrams for describing changes in the antenna directivity of the reception antenna in accordance with the first embodiment.
Figure 6B:
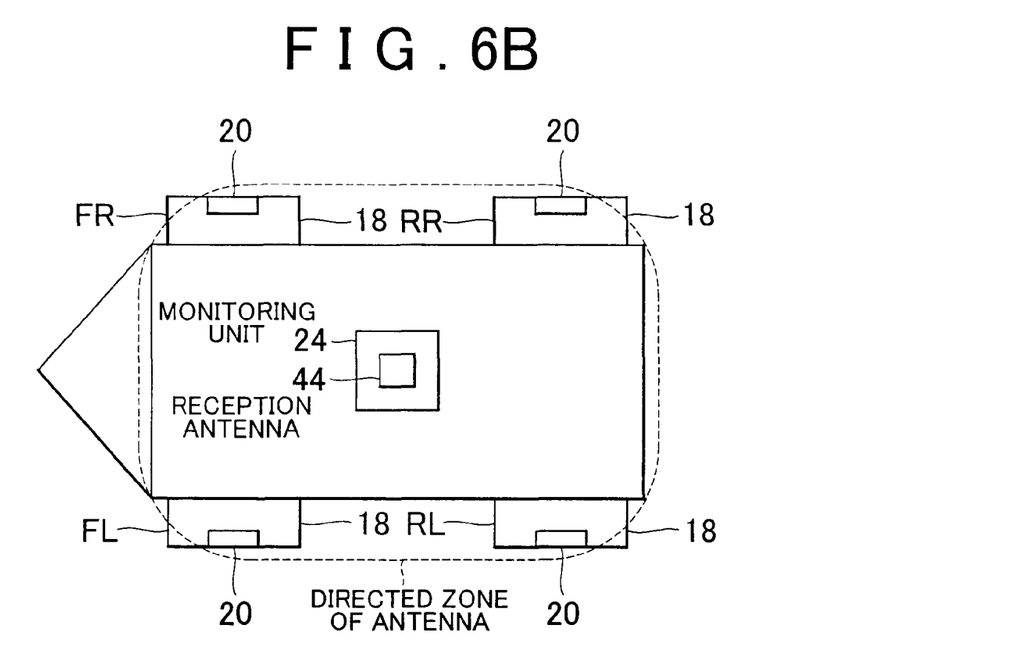
Figure 7:
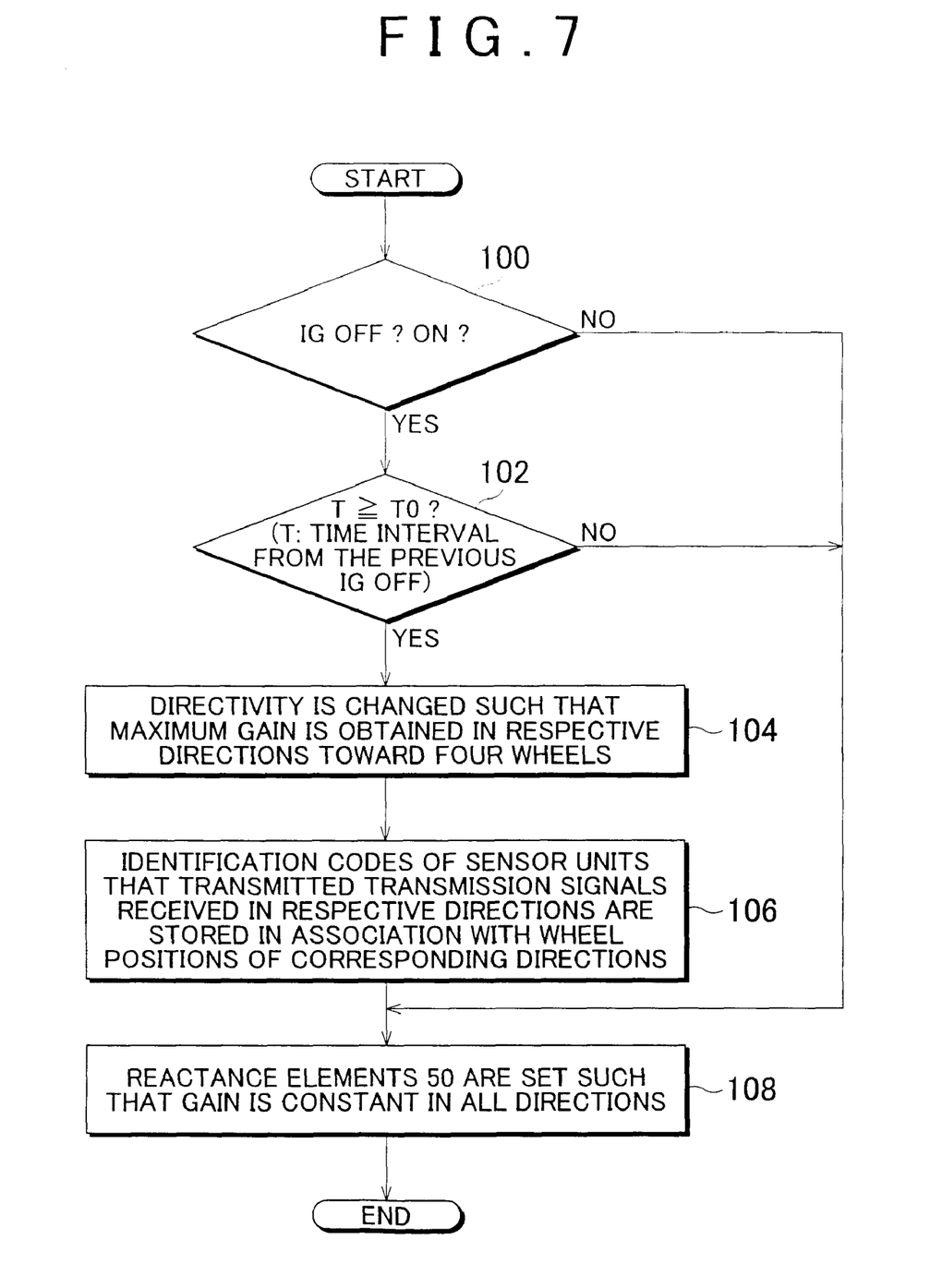
FIG. 7 shows a flow chart of a control routine carried out by the monitoring unit in the wheel monitoring system in accordance with the first embodiment.
Figure 8A:
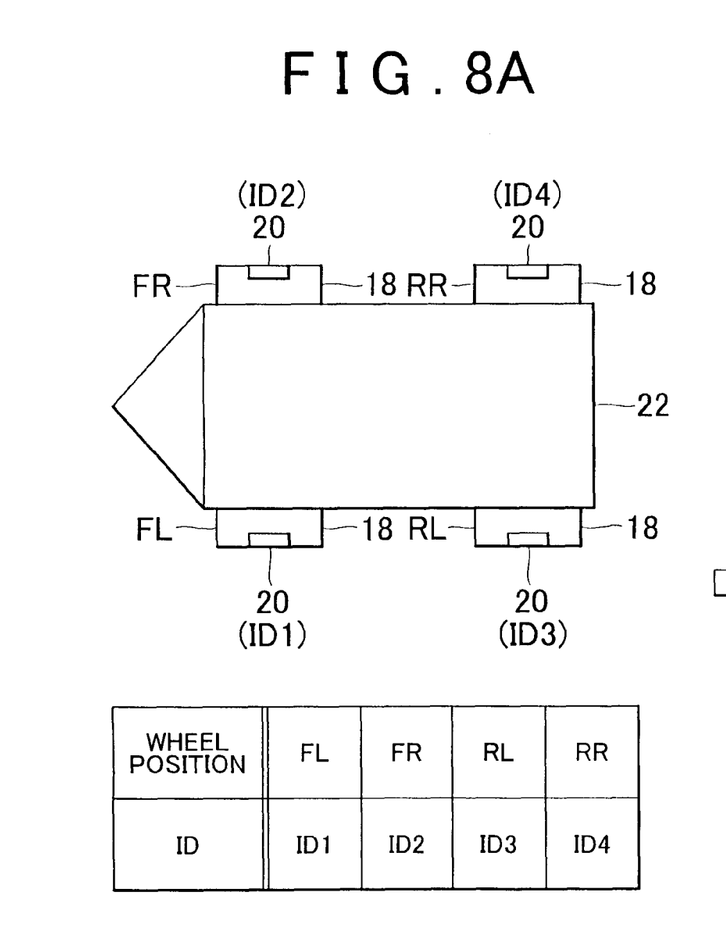
FIGS. 8A and 8B illustrate a change in relations between positions of the respective wheels and identification codes of the sensor units stored in a memory unit before and after a wheel exchange (tire rotation)
Figure 8B:
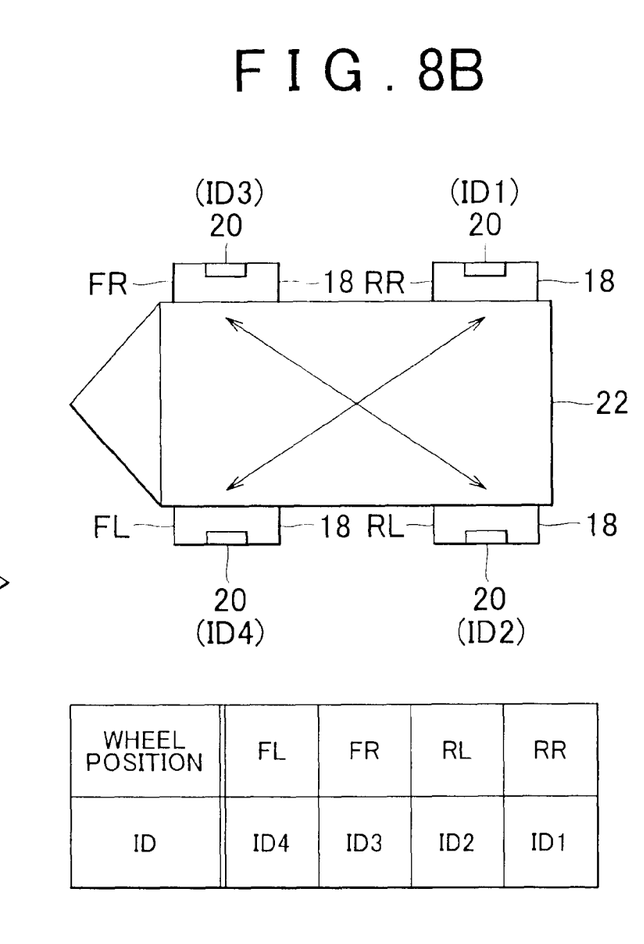

Thereafter, the operations of the vehicle condition monitoring system in accordance with the present embodiment will be described with reference to FIGS. 6A to 8B. FIGS. 6A and 6B present conceptual diagrams for describing changes in the antenna directivity of the reception antenna in accordance with the present embodiment, wherein FIG. 6A corresponds to a case where the directivity of the reception antenna 44 is such that the antenna gain of the reception antenna 44 is maximized in the direction toward the position one of the wheels 18, and FIG. 6B corresponds to a case where the antenna gain of the reception antenna 44 is constant on the horizontal plane regardless of the direction. Further, FIG. 7 shows a flow chart of a control routine that is carried out by the monitoring unit in the wheel monitoring system in accordance with the present embodiment; and FIGS. 8A and 8B illustrate the change in relations between the positions of the respective wheels and the identification codes of the respective sensor units stored in a memory unit before and after a wheel exchange.

In the vehicle condition monitoring system in accordance with the present embodiment, each sensor unit 20 measures a tire air pressure of a corresponding one of the wheels 18 based on the output signal of the air pressure sensor 32 every time when a predetermined time interval (e.g., 1 minute) elapses. Further, when the measurement has been completed, each sensor unit 20 generates a transmission signal including data of the air pressure and the sensor unit's identification code. The transmission signal is carried by a carrier wave that is a predetermined electromagnetic wave and that is transmitted from the transmission antenna 36. Further, although the predetermined time interval at which each sensor unit 20 measures the air pressure and then transmits the transmission signal may be set to be equal between the respective sensor units 20, it is also possible to set the predetermined time interval to vary between the respective sensor units 20 within a certain time period.

The monitoring unit 24 monitors the status of the ignition switch 52 and determines whether the ignition switch 52 is switched ON (step 100). Further, the monitoring unit 24 also calculates the time interval T from the time when the ignition switch 52 is switched OFF to the time when the ignition switch 52 is switched ON.

If the ignition switch 52 is determined to have been switched ON (YES in step 100), the monitoring unit 24 determines whether the time interval T is longer than or equal to a specific time period T0 (step 102). Herein, the specific time period T0 is set to be a typical time period required for detaching the wheels 18 from the vehicle and exchanging them, and is determined experimentally in advance.

Further, when the ignition switch 52 is switched ON, if the time interval T is determined to be longer than or equal to the specific time period T0 (YES in step 102), it is determined that there is a possibility that the exchange of the wheels 18 was performed after the last time the ignition switch 52 was switched OFF, and the sequence of the operations moves on to a mode for setting the relations between the sensor units 20 installed at the respective wheels 18 and the positions FL, FR, RL and RR of the wheels 18 (hereinafter referred to as "relation setting mode").

When the sequence of the operations has proceeded to the relation setting mode, the monitoring unit 24 changes the antenna directivity of the reception antenna 44 such that the antenna gain is maximized in a direction FL, FR, RL and RR, respectively, as shown in FIG. 6A. More particularly, the monitoring unit 24 determines a sequence of directions FL, FR, RL and RR (for example, a sequence of directions FL→FR→RL→RR) in which the antenna gain is maximized. Thereafter, the monitoring unit 24 reads out from the memory unit 54 appropriate combinations of the reactance values $x_{FL}$, $x_{FR}$, $x_{RL}$ and $x_{RR}$ of the reactance elements 50 in the parasitic antenna elements 48 such that the antenna gain of the reception antenna 44 is maximized sequentially in the directions as the determined sequence of directions and thus the reception antenna 44 can receive only corresponding ones of the transmission signals transmitted from the sensor units 20 at the wheel 18 in the corresponding directions, sequentially, and the monitoring unit 24 performs the operations for adjusting the reactance values of the reactance elements 50 to the appropriate combinations of the reactance values, sequentially (step 104).

After the above operations are performed, the antenna directivity of the reception antenna 44 is sequentially changed such that the antenna gain of the reception antenna 44 is maximized in the directions FL, FR, RL and RR, sequentially. Herein, the duration that the maximum gain is maintained in each direction FL, FR, RL and RR, i.e., the time interval between two successive changes of the directions in which the antenna gain is maximized, is set to be at least longer than a time interval during which each sensor unit 20 measures the air pressure and transmits the transmission signal.

As described above, after controlling the antenna directivity of the reception antenna 44, the reception antenna 44 cannot receive electromagnetic waves other than those that travel in a specific direction. For example, if the antenna directivity is adjusted such that the antenna gain is maximized in a direction RR (i.e., the direction toward the right rear one of the wheels 18), the reception antenna 44 only receives transmission signals that are transmitted from the sensor unit 20 installed at the right rear one of the wheels 18.

During the relation setting mode, the antenna directivity of the reception antenna 44 is adjusted so that the antenna gain is maximized in directions FL, FR, RL and RR, the monitoring unit 24 receives the transmission signals from the sensor units 20 at the wheels 18 installed in the directions in which the antenna gain is maximized. Herein, the sensor unit 20 from which the reception antenna 44 receives the transmission signal is limited to the one at the wheel 18 installed in the direction in which the antenna gain is maximized, and the transmission signals of the sensor units 20 at the remaining wheels 18 are not received by the reception antenna 44. In this respect, the four sensor units 20 installed at the wheels 18 correspond to the directions FL, FR, RL and RR with one-to-one correspondence.

During the relation setting mode, the antenna directivity of the reception antenna 44 is such that the antenna gain is maximized in directions toward the positions of the wheels, when the monitoring unit 24 receives the transmission signal from one of the sensor units 20, the monitoring unit 24 extracts the identification code of the sensor unit 20 that has sent that transmission signal. Then, the monitoring unit 24 stores the extracted identification code of the sensor unit 20 that has sent that transmission signal in association with the position of the wheel corresponding thereto (step 106). In this manner, the positions FL, FR, RL and RR of the wheels 18 at which the sensor units 20 are respectively installed are stored in the memory unit 54 in association with the identification codes of the sensor units 20 with one-to-one correspondence.

For example, as shown in FIG. 8A, the sensor unit 20-1 may be assigned identification code ID1 installed at the left front wheel 18, the sensor unit 20-2 may be assigned identification code ID2 installed at the right front wheel 18, the sensor unit 20-3 may be assigned identification code ID3 installed at the left rear wheel 18, and the sensor unit 20-4 may be assigned identification code ID4 installed at the right rear wheel 18. The identification codes ID1 to ID4 are stored respectively in association with the positions of the wheels FL, FR, RL and RR in the memory unit 54 as the identification codes of the sensor units 20.

During the relation setting mode, the monitoring unit 24 adjusts the antenna directivity of the reception antenna 44 to the directions toward the positions of the wheels FL, FR, RL and RR, and updates all the relations of the four sensor units 20 and the positions of the wheels FL, FR, RL and RR based on the received results of the respective directions. Thereafter, sequence of the operations moves on to a mode for receiving the transmission signals (hereinafter referred to as "normal mode").

When the sequence of the operations has proceeded to the normal mode, as shown in FIG. 6B, the monitoring unit 24 changes the antenna directivity of the reception antenna 44 such that the antenna gain is substantially constant in all the directions (or in some directions including FL, FR, RL and RR) on the XY-plane. More particularly, the monitoring unit 24 reads out from the memory unit 54 an appropriate combination of the reactance values $x_{FL}$, $x_{FR}$, $x_{RL}$ and $x_{RR}$ of the reactance elements 50 in the parasitic antenna elements 48 such that the antenna gain of the reception antenna 44 is substantially constant in all the directions on the XY-plane and the reception antenna 44 can receive the transmission signals transmitted from all of the sensor units 20. Then, the monitoring unit 24 performs the operations for adjusting the reactance values of the reactance elements 50 to the appropriate combination of the reactance values (step 108).

After the above operations are performed, the antenna directivity of the reception antenna 44 is adjusted such that the antenna gain of the reception antenna 44 is constant in all the directions on XY-plane. In this case, the reception antenna 44 can receive the electromagnetic waves traveling in all the directions on the XY-plane. Therefore, during the normal mode, the monitoring unit 24 can receive the transmission signals from each sensor unit 20.

If the monitoring unit 24 stores relations between the four sensor units 20 and the positions of the wheels in the memory unit 54 during the relations setting mode and then receives the transmission signal from one of the sensor units 20 by the reception antenna 44 during the normal mode, the monitoring unit 24 extracts the data of the tire air pressure and the identification code of the sensor unit 20 that has transmitted the transmission signal from the transmission signal, and then specifies the position of the wheel 18 associated with the extracted identification code by referring to the relations stored in the memory unit 54. Thus specified position of the wheel 18 is same as the position of wheel at which the sensor unit 20 that has transmitted the transmission signal received by the receptions antenna 44 is installed.

If, for example, as shown in FIG. 8A, the identification codes ID1 to ID4 are stored respectively in association with the positions of the wheels FL, FR, RL and RR in the memory unit 54 as the identification codes of the sensor units 20, and if the identification code extracted from the transmission signal received by the reception antenna 44 is ID3, the position RL of the wheel 18 corresponding to ID3 is specified as the position of the wheel at which the sensor unit 20 that has transmitted that transmission signal.

Further, if the reception antenna 44 receives the transmission signal from the sensor unit 20 during the normal mode, after the monitoring unit 24 extracts the data of the tire air pressure and the identification code of the sensor unit 20 that has transmitted the transmission signal from the transmission signal, the monitoring unit 24 determines the tire air pressure based on the data of the tire air pressure included in the transmission signal.

During the normal mode, after the monitoring unit 24 receives the transmission signal from that sensor unit 20, specifies the position of the wheel at which the sensor unit 20 is installed and determines the tire air pressure as described above. The monitoring unit 24 makes a one-to-one correspondence between the determined tire air pressure and the wheel 18 whose tire is in the determined state. Thereafter, if, for example, the air pressure of one of the tires is abnormal, the position of the wheel corresponding to that tire is displayed in the display 45.

As described above, in accordance with the monitoring system of the present embodiment, by changing the antenna directivity of the reception antenna 44 such that the antenna gain is sequentially maximized in the directions toward the respective positions of the wheels 18 during the relation setting mode, the memory unit 54 can store the relations between the positions of the respective wheels 18 and the identification codes of the sensor units that transmitted the transmission signals received by the reception antenna 44. Then, by adjusting the antenna directivity such that the antenna gain of the reception antenna 44 is substantially constant in all the directions during the normal mode after storing the relation, when the reception antenna 44 receives the transmission signal from one of the sensor units 20, the position of the wheel at which that sensor unit 20 is installed can be specified based on the relations between the identification codes ID of the four sensor units 20 and the positions of the wheels FL, FR, RL and RR stored in the memory unit 54.

In this configuration, the tire air pressure of the wheels 18 is monitored by each sensor unit 20, and, when an abnormality occurs, the position of the corresponding wheel 18 at which the corresponding one of the sensor units 20 is installed, i.e., the position of the wheel 18 at which the tire air pressure is abnormal, can be specified. Thus, in accordance with the present embodiment, an occupant of the vehicle may be notified of the abnormal tire air pressure through the display 45 by specifying the position of the wheel whose tire is at the abnormal state of air pressure.

Further, if, for example, the identification codes ID1 to ID4 are stored respectively in association with the positions of the wheels FL, FR, RL and RR in the memory unit 54 as the identification codes of the sensor units 20 as shown in FIG. 8A, and thereafter a wheel exchange is performed to exchange the left front wheel with the right rear wheel and the right front wheel with the left rear wheel, the identification codes ID1 to ID4 are updated by being stored respectively in association with the position of the wheel RR, RL, FR and FL, in the memory unit 54 as the identification codes of the sensor units 20 as shown in FIG. 8A (refer to FIG. 8B). Therefore, in accordance with the present embodiment, if an exchange of the wheels 18 is performed, the relations between the identification codes ID of the sensor units 20 and the positions of the respective wheels 18 can be timely updated to be those after the wheel exchange at the time of driving the vehicle first after the wheel exchange.

In this configuration, to specify the position of the wheel at which a particular sensor unit 20 is installed, it is not necessary to install a plurality of transmitting units in the main body 22 of the vehicle correspondingly to the positions of the respective wheels FL, FR, RL and RR, and, further, it is sufficient to install a single reception circuit 42 and a single reception antenna 44 at only a single place near a central portion of the main body 22 of the vehicle instead of installing a plurality of reception circuits and reception antennae in the monitoring unit 24 correspondingly to the positions FL, FR, RL and RR of the respective wheels 18. In addition, because the reception antenna 44 is configured by the feed antenna element 46 and the four parasitic antenna elements 48, it is sufficient to install only a single feeder unit in the reception antenna 44.

Therefore, in accordance with the monitoring system of the present embodiment, the position of the wheel 18 at which the sensor unit 20 having the transmission circuit 34 and the transmission antenna 36 that have transmitted the data of the tire air pressure of one of the wheels 18 may be specified by using the monitoring unit 24 including a reception antenna 44 having only one feeder unit in the main body 22 of the vehicle. Thus, the monitoring unit capable of performing such function can be implemented by a simple configuration. Therefore, the configuration of parts of the main body 22 near the respective wheels 18 may be simplified, so that the number of the production processes or the production cost of the wheel condition monitoring system can be reduced.

Further, when the ignition switch 52 is switched ON, if the time interval T from the last time the ignition switch 52 is switched OFF to the time the ignition switch 52 is next switched ON is shorter than the specific time period T0 (NO in step 102), the sequence of the operations skips the relation setting mode and proceeds to the normal mode, and the antenna directivity of the reception antenna 44 is adjusted such that the antenna gain is substantially constant in all the directions on the XY-plane (step 108).

If the time interval T from the last time the ignition switch 52 is switched OFF to the time when the ignition switch 52 is next switched ON is shorter than the specific time period T0, there is no possibility that an exchange of the wheels 18 were performed during that time interval, and it is not necessary to update in the memory unit 54 the relations between the respective sensor units 20 and the positions FL, FR, RL and RR of the wheels 18 at which the sensor units 20 are installed. Therefore, in accordance with the monitoring system of the present embodiment, it is possible to avoid an unnecessary update of the relations between the respective sensor units 20 and the positions FL, FR, RL and RR of the wheels 18 at which the sensor units 20 are installed.

Further, in the above-described embodiment, the transmission circuits and the transmission antennae in the sensor units 20 serve, for example, as the "transmitters", the reception circuit 42 and reception antenna 44 in the monitoring unit 24 serve, for example, as the "receiver". Furthermore, the "identification data" may include the identification codes ID of the sensor units 20, and the "conditions of the wheels" may include measures such as the tire air pressure of the wheels 18.

Furthermore, in the above-described embodiment, the "antenna directivity control unit" may be implemented by, for example, the control circuit 40 in the monitoring unit 24 performing the operation of Step 104 in the sequence shown in FIG. 7, and the "wheel position determination unit" may be implemented by, for example, the control circuit 40 specifying the position of the wheel at which the sensor unit 20 that has transmitted the transmission signal is installed based on the relations between the identification codes ID of the respective sensor units 20 and the positions of the wheels stored in the memory unit 54 when the reception antenna receives the transmission signal from the sensor unit 20 during the normal mode.

However, although it has been described that, in accordance with the above-described embodiment, the directivity of the reception antenna 44 is changed such that the antenna gain of the reception antenna 44 is maximized sequentially in the directions toward the positions of the respective wheels to thereby update the relations between the identification codes ID of the sensor units 20 and the positions of the wheels FL, FR, RL and RR when the status of the ignition switch 52 is switched from OFF to ON, the present invention is not limited thereto. For example, it is also possible to configure the monitoring system to provide a special conversion switch that is manipulated by an occupant of the vehicle so that, when the special conversion switch is switched from OFF to ON, the antenna directivity of the reception antenna 44 is adjusted as described above to thereby update the relations in the memory unit 54 as described above.

In this case, the special conversion switch corresponds to the "predetermined switch" described in the present invention. Further, in such configuration, preferably for avoiding an unnecessary update of the relations between the respective sensor units 20 and the positions FL, FR, RL and RR of the wheels 18 at which the sensor units 20 are installed, it is determined whether or not the time interval T from the time when the special conversion switch is last switched from ON to OFF to the time when the special conversion switch is presently switched from OFF to ON is determined to be longer than or equal to a specific time period, and if the determination result is NO, the above-described adjustment of the antenna directivity and the above-described update of the data in the memory unit 54 are not performed.

Further, although it has been described that, in accordance with the above-described embodiment, each sensor unit 20 generates the transmission signal including the data of the tire air pressure of the corresponding one of the wheels 18 and the data of the identification code thereof to thereby transmit the transmission signal from the transmission antenna 36 toward the monitoring unit 24 whenever the predetermined time interval elapses, it is also possible to configure the monitoring system such that the transmission signal as described above is transmitted from the transmission antenna 36 whenever an instruction signal is received from the monitoring unit.

Figure 9:
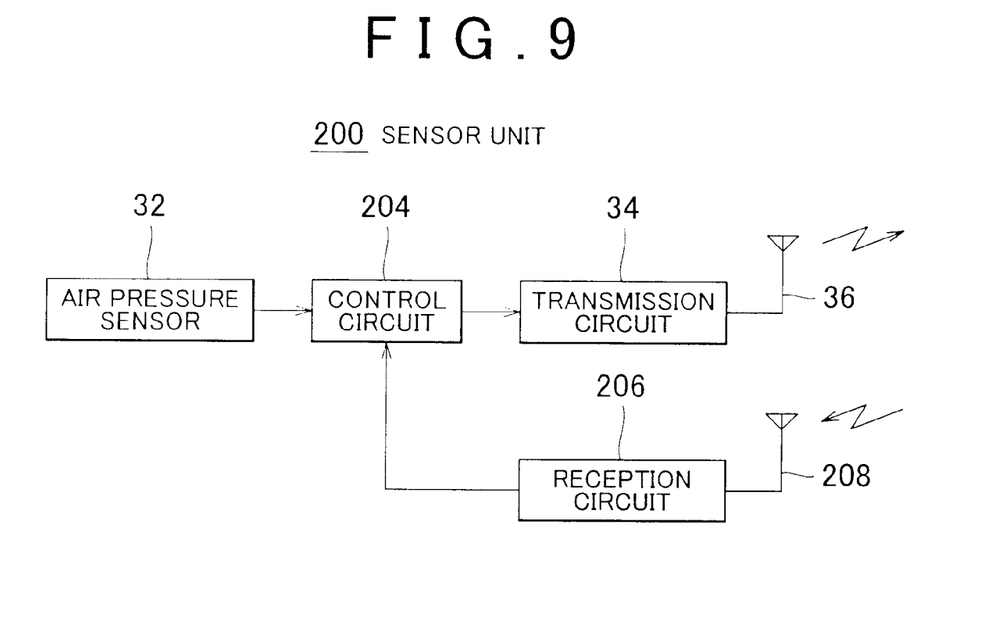
FIG. 9 depicts a configuration diagram of each sensor unit in accordance with a modified embodiment of the present invention.
Figure 10:
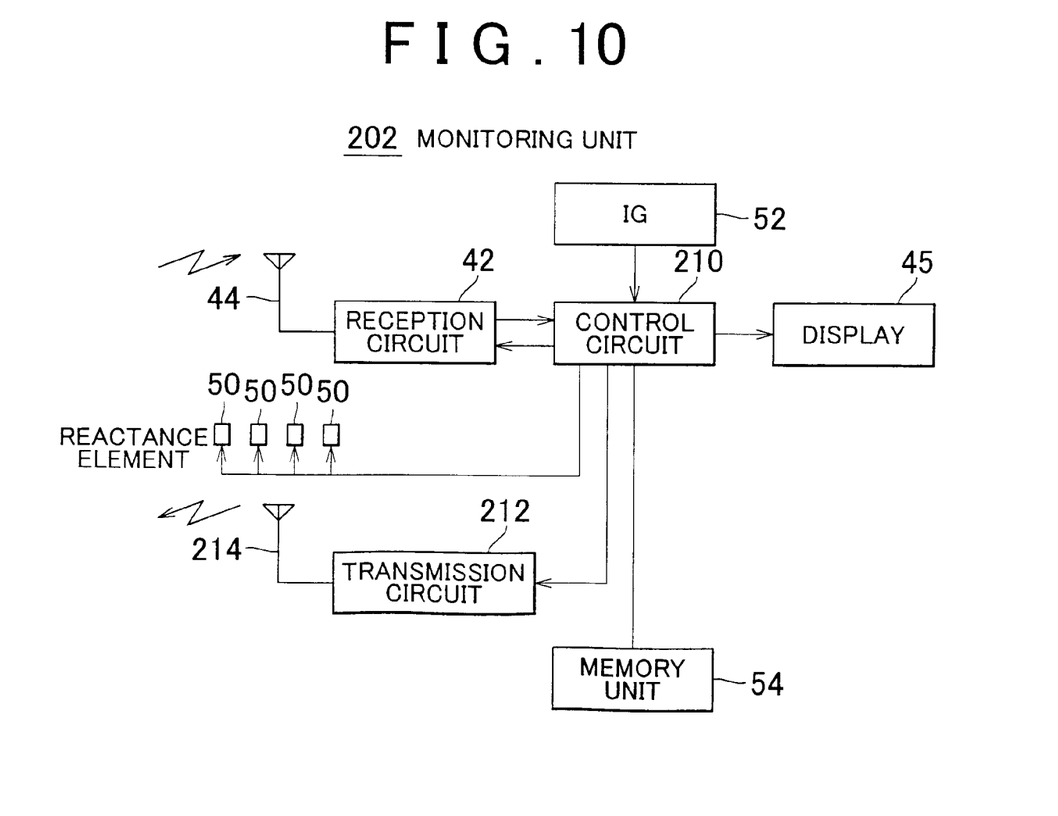
FIG. 10 shows a configuration diagram of a monitoring unit in accordance with the modified embodiment of the present invention.

More particularly, an example of such vehicle condition monitoring system, which will hereinafter be referred to as a modified embodiment of the present invention, is illustrated in FIGS. 9 and 10, in which like reference numerals designate like parts. As shown therein, the vehicle condition monitoring system in accordance with the modified embodiment of the present invention includes a monitoring unit 202, which has a control circuit 210 configured mainly by a computer for performing various controls. The control circuit 210 is connected to the reception circuit 42; the display 45; the ignition switch 52; the memory unit 54; and a plurality of transmission circuits 212 respectively corresponding to the wheels 18. Each transmission circuit 212 is connected to a transmission antenna 214. Each transmission antenna 214 is directed to a region where only one of the wheels 18 that corresponds thereto resides. The control circuit 210 extracts from the transmission signals the data of the tire air pressure of the wheels 18 and the data of the identification codes ID of the sensor units 200 that have sent that transmission signals based on the signals transmitted from the reception circuit 42, respectively. Further, the control circuit 210 controls the transmission circuits 212 to transmit from the transmission antennae 214 instruction signals for requesting the transmission of the transmission signals including the data of the tire air pressure of the wheels 18 and the data of the identification codes ID thereof. The transmission circuits 212 transmit the instruction signals of the control circuits 210 by having them to be carried by carrier waves that are predetermined electromagnetic waves from the transmission antennae 214.

Further, as shown in FIG. 9, each sensor unit 200 in the vehicle condition monitoring system of the present embodiment includes a control circuit 204. The control circuit 204 is connected to the air pressure sensor 32, the transmission circuit 34 and the reception circuit 206, which is in turn connected to the reception antenna 208. The reception antenna 208 receives the instruction signals transmitted from the monitoring unit 202 and carried by the carrier waves. Then, the reception circuit 206 detects the signals received by the reception antenna 208, shapes waveforms thereof, and then provides the wave-shaped signals to the control circuit 204. Thereafter, the control circuit 204 generates the transmission signals including the data of the tire air pressure of the corresponding wheels 18 and the data of the identification codes ID of the sensor units 200 that have transmitted that transmission signals based on the signals transmitted from the reception circuit 206 in response to the instruction signals of the monitoring unit 202, and controls the transmission circuits 34 to make it transmit the generated transmission signals from the transmission antenna 36.

In this monitoring system, the monitoring unit 202 monitors the status of the ignition switch 52, and determines whether the ignition switch 52 has been switched ON (step 100). Further, the monitoring unit 24 calculates a time interval T from the time when the ignition switch 52 is switched OFF to the time when the ignition switch 52 is switched ON. Thus, when the ignition switch 52 is switched to ON, if the time interval T is determined to be longer than or equal to the specific time period T0, the operations of the monitoring system proceed to a relation-setting mode. Then, by adjusting the reactance values x of the respective parasitic antenna elements 48 in the reception antenna 44, the antenna directivity of the reception antenna 44 is sequentially changed such that the antenna gain of the reception antenna 44 is sequentially maximized in the directions toward the respective wheels. Further, by sequentially controlling the transmission circuits 212, the instruction signals for requesting the transmission of the transmission signals are transmitted from each transmission antenna in a predetermined order.

Upon receiving the instruction signal from the monitoring unit 202, each sensor unit 200 measures the tire air pressure of the corresponding wheel 18 based on the output signal of the air pressure sensor 32. Then, when the measurement has been completed, each sensor unit 20 generates a transmission signal including data of the air pressure and data of its identification code, and has the transmission signal to be carried by a carrier wave that is a predetermined electromagnetic wave and then to be transmitted from the transmission antenna 36 to the monitoring unit 202. During the relation-setting mode, when the monitoring unit 202 receives the transmission signal from each sensor unit 200, the monitoring unit 24 stores the identification code of the sensor unit 200 that has sent that transmission signal in the memory unit 54 in association with the position of the wheel corresponding thereto. In this manner, the positions FL, FR, RL and RR of the wheels 18 at which the sensor units 200 are installed and the identification codes of the sensor units 200 are stored in the memory unit 54 with one-to-one correspondence. Thereafter, the monitoring unit 202 performs the operations same as those of the monitoring unit 24 in accordance with the first embodiment.

As described above, during the relation-setting mode in accordance with the modified embodiment of the present invention, the memory unit 54 stores the relation between the position of each wheel 18 and the identification code of each sensor unit 200 that has transmitted the transmission signals received by the reception antenna 44. Further, during the normal mode after storing the relations, when the reception antenna 44 receives the transmission signal from the sensor unit 200, the position of the wheel at which that sensor unit 200 is installed can be specified based on the relations between the identification codes ID of the four sensor units 20 and the positions of the wheels FL, FR, RL and RR stored in the memory unit 54.

In accordance with the modified embodiment of the present invention, although it is necessary to install a plurality of the transmitters 212 and a plurality of the transmission antennae 214 in the main body 22 of the vehicle correspondingly to the positions of the respective wheels FL, FR, RL and RR in order to specify the position of the wheel at which a specific sensor unit 200 is installed, it is still not necessary to install a plurality of reception circuits and reception antennae in the monitoring unit 202 correspondingly to the positions FL, FR, RL and RR of the respective wheels 18. Therefore, the effects equivalent to those of the first embodiment of the present invention can be achieved.

Further, in accordance with the modified embodiment of the present invention, each sensor unit 200 generates the transmission signal including the data of the tire air pressure of the corresponding one of the wheels 18 and the data of the identification code thereof to thereby transmit the transmission signal from the transmission antenna 36 toward the monitoring unit 202 not when a predetermined time interval elapses but when the instruction signal of the monitoring unit 202 is received. Thus, each sensor unit 200 is prevented from generating an unnecessary transmission signal to transmit it through the transmission antenna 36. Further, in relation to storing the relations between the positions of the wheels 18 and the identification codes ID of the sensor units 200 in the memory unit 54, since the monitoring unit 202 can perform the transmission of the instruction signal for requesting the transmission of the transmission signal and the change in the directivity of the reception antenna 44 at the same time, the transmission signals can be received from the sensor units 200 quickly after the transmission of the instruction signal. Therefore, the time period during which the maximum gain is maintained in a specific direction can be made shorter than that of the first embodiment, thereby making it possible to store the above-mentioned relations in the memory unit 54 during the relation-setting mode within a short time.

Further, in accordance with the modified embodiment of the present invention, the "body-mounted transmitter" may be implemented by the transmission circuits 212 and the transmission antenna 214 in the monitoring unit 202 correspond, and the "wheel-mounted receiver" may be implemented by the reception circuits 206 and the reception antenna 208 in the sensor unit 200.

Although it has been described that, in accordance the embodiments described above, the monitoring system monitors the tire air pressure of each wheel 18 by using the sensor units installed at each wheel 18, the object to be monitored by the monitoring system should not be construed to be limited thereto, and it is also possible to apply the invention to the monitoring system for monitoring the temperatures or distortions of tires or the like.

Further, although it has been described that, in accordance the embodiments described above, the antenna directivity of the reception antenna 44 is changed to be directed in the directions toward the positions of the four wheels 18 in order to set the relations between the sensor units installed at the four wheels 18 in the vehicle and the positions FL, FR, RL and RR thereof, the present invention should not be construed to be limited thereto. Alternatively, an additional wheel for a spare tire may be further included, and the antenna directivity may be changed to be directed in the directions toward the positions of the five wheels in order to set the relations between the sensor units installed at the five wheels and the positions of the five wheels. Alternatively, the invention may be adapted correspondingly to such vehicles having two or three wheels or more than five wheels.

Further, although it has been described that, in accordance the embodiments described above, the antenna directivity of the reception antenna 44 is changed such that the maximum gain can be obtained respectively in all the directions toward the positions of the wheels 18 during the relation setting mode, the present invention should not be construed to be limited thereto, and it is also possible that the antenna directivity of the reception antenna 44 is changed such that the maximum gain can be obtained respectively in all-but-one directions toward the positions of the wheels 18. For example, the antenna directivity of the reception antenna 44 may be changed in the directions FL, FR and RL but not in the direction toward the position RR.

In accordance with this modification, the operations for storing in the memory unit 54 the identification codes ID of the sensor units 20 installed at the wheels 18 in connection with the positions of the wheels 18 can be simplified. Further, because a specific sensor unit 20 that has an identification code that is not stored in connection with any wheel position in the memory unit 54 is installed at a specific one of the wheels 18 toward whose position the reception antenna 44 is not directed, when a transmission signal from any one of the sensor units 20 is received by the reception antenna 44 in the monitoring unit 24 during the normal mode, the position of the wheel at which the one of the sensor units 20 that has sent the transmission signal is installed can be specified by comparing the identification code included in the transmission signal with the above-mentioned relations stored in the memory unit 54. For example, even if the transmission signal is been transmitted from a sensor unit 20 installed at the specific one of the wheels 18 toward whose position the reception antenna 44 is not directed during the relation setting mode, the position of the wheel at which the one of the sensor units 20 that has transmitted the transmission signal is installed can be specified, because it can be inferred that the identification code included in the transmission signal corresponds to the one of the sensor units 20 installed at the wheel whose position (for example, RR) is not stored in association with any identification code in the memory unit 54.

Further, although it has been described that, in accordance the embodiments described above, the antenna directivity of the reception antenna 44 is changed such that the antenna gain is maximized in the directions toward the respective wheel positions to thereby proceed to the relation-setting mode for updating the above-mentioned relations stored in the memory unit 54 whenever the ignition switch 52 is switched ON except when the above-defined time interval T is smaller than the specific time period T0, it is also possible to configure the sequence of the operations such that, after proceeding to the relation-setting mode, the changing of the antenna directivity is stopped to thereby return to the normal mode if, when the antenna directivity of the reception antenna 44 has been changed for the first one or two times, the relations between the identification codes included in the transmission signals from the sensor units 20 received by the reception antenna 44 and the positions of the wheels 18 are same as the corresponding relations already stored in the memory unit 54. In case where the above conditions are satisfied, is can be inferred that an exchange of the wheels 18 has not been performed, and that the relations between the remaining wheel positions and the remaining identification codes are also same as the immediately preceding ones, i.e., those already stored in the memory unit 54. Therefore, in accordance with this modification, the above-defined relations stored in the memory unit 54 can be set properly, so that the cost or the time required for the operations for setting the above-defined relations can be saved.

While the invention has been shown and described with respect to the preferred embodiments, it will be understood by those skilled in the art that various changes and modifications may be made without departing from the scope of the invention as defined in the following claims.

What is claimed is:

1. A wheel condition monitoring system that includes a plurality of transmitters, respectively installed at a plurality of wheels of a vehicle, that transmit wheel condition data that indicates the conditions of a corresponding wheel of the plurality of wheels, and a receiver, installed on a main body of the vehicle, that receives the wheel condition data transmitted from the respective transmitters, the wheel condition monitoring system monitoring the condition of each wheel of the plurality of wheels based on the wheel condition data transmitted from the transmitters and received by the receiver, comprising:
    an antenna directivity control unit that controls an antenna directivity of the receiver;
    a memory unit that assigns relations between the identification data of each transmitter, received by the receiver, and the position of the corresponding wheel, and stores the assigned relations when the antenna directivity of the receiver is changed by the antenna directivity control unit so that an antenna gain is sequentially maximized based on the position and orientation of each wheel; and
    a wheel position determination unit that determines the position of the wheel at which one of the plurality of transmitters that has transmitted a transmission signal including the wheel condition data and the identification data thereof, is installed, when the receiver receives the transmission signal, based on the relations between the identification data of the each transmitter and the position of the corresponding wheel stored in the memory unit, wherein
    the antenna directivity control unit includes:
    a normal reception antenna directivity changing unit that changes, after relations between the identification data of all the transmitters and the positions of the corresponding wheels are stored in the memory unit, the antenna directivity of the receiver so that the receiver is able to receive the wheel condition data transmitted from all the transmitters,
    a relation confirmation antenna directivity changing unit that changes the antenna directivity of the receiver such that the antenna gain is sequentially maximized based on the position and orientation of each wheel in order to store the relations between the identification data of each transmitter and the position of the corresponding wheel in the memory unit when an ignition switch of the vehicle is turned on or a predetermined switch is manipulated by an occupant of the vehicle, and
    a changing stop unit that stops a change in the antenna directivity of the receiver by the relation confirmation antenna directivity changing unit when a time interval between a previous turn-off and a current turn-on of the ignition switch or a time interval between a previous and a current manipulation of the predetermined switch is shorter than a predetermined time that is required to exchange the wheels.

2. The wheel condition monitoring system according to claim 1, wherein the receiver includes:
    a feed antenna element; and
    a plurality of parasitic antenna elements, each having a controllable reactance.

3. The wheel condition monitoring system according to claim 2, wherein the parasitic antenna elements are respectively disposed in directions running toward the wheel positions when viewed from the feed antenna element.

4. The wheel condition monitoring system according to claim 1, wherein the antenna directivity control unit changes the antenna directivity of the receiver in at least all-but-one directions among directions toward the wheel positions.

5. The wheel condition monitoring system according to claim 1, wherein, if the relation between the wheel position and the identification data, which is received by the receiver and transmitted from each transmitter disposed in initial one or two wheel directions after starting a change of the antenna directivity, is identical to a previous relation stored in the memory unit, the antenna directivity control unit stops a further change of the antenna directivity.

6. The wheel condition monitoring system according to claim 1, wherein, after the identification data of each transmitter is stored in the memory unit by assigning the relations between the identification data of each transmitter and the position of the corresponding wheel, the antenna directivity of the receiver is changed such that the antenna gain of the receiver is substantially constant in all directions.

7. The wheel condition monitoring system according to claim 1, wherein, after the identification data of each transmitter is stored in the memory unit by assigning the relations between the identification data of each transmitter and the position of the corresponding wheel, the antenna directivity of the receiver is changed such that the antenna gain of the receiver is substantially constant in directions toward the wheel positions.

8. The wheel condition monitoring system according to claim 1, further comprising:
    a body-mounted transmitter, installed on the main body of the vehicle, that transmits in a direction toward each wheel an instruction signal that requests each transmitter installed on each wheel to transmit the wheel condition data; and
    a wheel-mounted receiver, installed on each wheel, that receives the instruction signal from the body-mounted transmitter,
    wherein, when the wheel-mounted receiver receives the instruction signal from the body-mounted transmitter, each transmitter installed on each wheel transmits the transmission signal, including the wheel condition data representing a condition of the corresponding wheel, in response to the instruction signal.

9. The wheel condition monitoring system according to claim 1, wherein the relation confirmation antenna directivity changing unit changes the antenna directivity of the receiver such that the antenna gain is sequentially maximized based on the position and orientation of each wheel in order to store the relations between the identification data of each transmitter and the position of the corresponding wheel in the memory unit if the time interval between the previous turn-off and the current turn-on of the ignition switch is greater than the predetermined time that is required to exchange the wheels.

10. A wheel position detection method for a wheel condition monitoring system including a plurality of transmitters respectively installed on each wheel of a vehicle, that transmit wheel condition data representing a condition of the respective wheels, and a receiver installed on the main body of the vehicle for receiving the wheel condition data from the respective transmitters so that the wheel condition monitoring system monitors the condition of the corresponding wheel based on the wheel condition data received by the receiver, the wheel position detection method determining a position of the wheel at which the transmitters that has transmitted the wheel condition data is installed, the method comprising:

controlling an antenna directivity of the receiver;

storing identification data of each transmitter in a memory unit and assigning relations between the identification data of each transmitter and the position of the corresponding wheel, when the antenna directivity of the receiver is changed such that an antenna gain of the receiver is sequentially maximized in a direction toward each wheel; and determining a position of a specific wheel at which the transmitter that has transmitted a transmission signal is installed, when the receiver receives the transmission signal that includes the wheel condition data and identification data from the transmitter based on the relations between the identification data and positions of the corresponding wheel stored in the memory unit, wherein after storing relations between the identification data of each transmitter and the position of the corresponding wheel, the antenna directivity of the receiver is changed so that the receiver is able to receive the wheel condition data transmitted from all the transmitters, the antenna directivity of the receiver is changed such that the antenna gain is sequentially maximized based on the position and orientation of each wheel in order to store the relations between the identification data of each transmitter and the position of the corresponding wheel if an ignition switch of the vehicle is turned on or a predetermined switch is manipulated by an occupant of the vehicle, and the antenna directivity of the receiver is not changed if a time interval between a previous turn-off and a current turn-on of the ignition switch or a time interval between a previous and a current manipulation of the predetermined switch is shorter than a predetermined time that is required to exchange the wheels.

11. The wheel position detection method according to claim 10, wherein the receiver includes a feed antenna element and a plurality of parasitic antenna elements, each having a controllable reactance, and wherein the antenna directivity is changed by controlling reactance of each of the parasitic antenna elements.

12. The wheel position detection method according to claim 11, wherein the parasitic antenna elements are respectively disposed in directions running toward the wheel positions when viewed from the feed antenna element.

13. The wheel position detection method according to claim 10, wherein the antenna directivity of the receiver is changed in at least all-but-one directions among directions toward the wheel positions.

14. The wheel position detection method according to claim 10, wherein if the relation between the wheel position and the identification data, which is received by the receiver and transmitted from each transmitter disposed in initial one or two wheel directions after starting a change of the antenna directivity, is identical to a previous relation stored in the memory unit, the antenna directivity is not further changed.

15. The wheel position detection method according to claim 10, wherein after the identification data of each of the transmitters is stored in connection with the wheel positions, the antenna directivity of the receiver is changed such that the gain is substantially constant in all directions.

16. The wheel position detection method according to claim 10, wherein, after the identification data of each of the transmitters is stored in connection with the wheel positions, the antenna directivity of the receiver is changed such that the gain is substantially constant in directions toward the wheel positions.

17. The wheel position detection method according to claim 10, further comprising:

transmitting in a direction toward each of the wheel positions an instruction signal that requests the transmitter to transmit the wheel condition data; and receiving the instruction signal by a wheel-mounted receiver installed at each of the wheels, wherein, if the wheel-mounted receiver receives the instruction signal, each of the transmitters transmits the wheel condition data representing a condition of a corresponding wheel in response to the instruction signal.

18. The wheel position detection method according to claim 10, wherein the antenna directivity of the receiver is changed if the time interval between the previous turn-off and the current turn-on of the ignition switch is greater than the predetermined time that is required to exchange the wheels.

* * * * *